Oct. 30, 1928.
R. D. EVANS
1,689,867
SIGNALING SYSTEM
Filed May 28, 1924
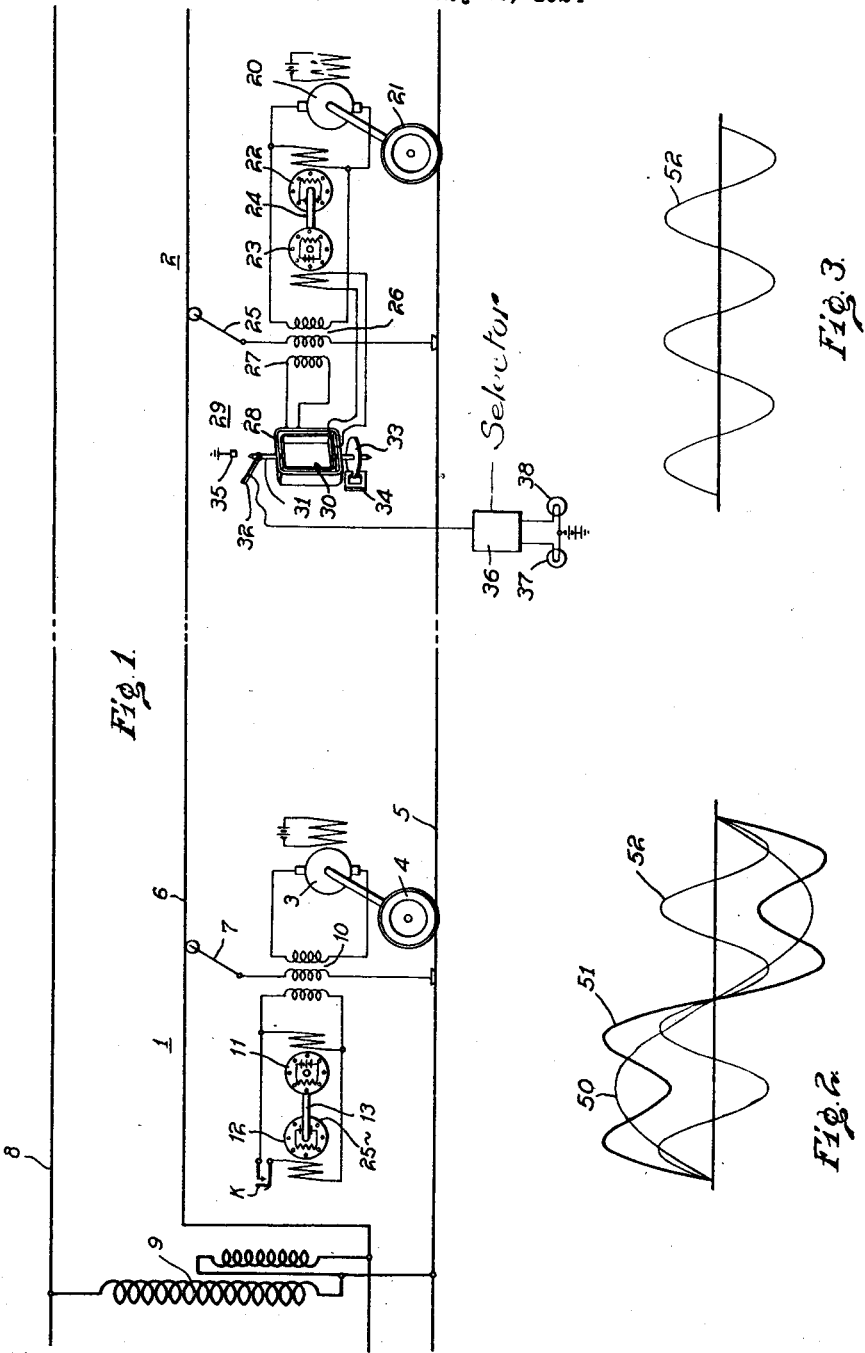
WITNESSES:
INVENTOR
Robert D. Evans.
BY
ATTORNEY Patented Oct. 30, 1928.

1,689,867

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

SIGNALING SYSTEM.

Application filed May 28, 1924. Serial No. 716,360.

My invention relates, in general, to signaling systems and more particularly to means for communicating over an alternating-current circuit.

One object of my invention is to provide means whereby a party in one electric locomotive may communicate with another party in a remotely-disposed electric locomotive over a trolley wire or electric supply circuit.

Another object of my invention is to provide means for accomplishing such communication by the use of alternating current.

A still further object of my invention is to provide means for rendering the receiving equipment unresponsive to line disturbances brought about by surges, short-circuits and the like.

There are other objects of the invention which, together with the foregoing, will be explained more fully hereinafter with reference to the accompanying drawing.

Referring now to the drawing, Figure 1 shows diagrammatically a section of an electrified railway system embodying the improved signaling system;

Fig. 2 is a curve diagram showing the manner in which the signaling voltage is superimposed upon the trolley voltage, and Fig. 3 is a curve diagram of the signaling voltage.

While, in the drawings and following description, I have specified certain values for frequencies and have exaggerated the proportions of the voltages shown in certain curves, it will be understood that I may use other frequencies and curves of proper proportion.

In practicing my invention, I provide a synchronous single-phase alternating-current motor that is connected mechanically to a generator that is adapted to generate an alternating voltage of 25 cycles. The generator is so constructed as to generate also a voltage of 75 cycles. The signaling generator is so inductively connected that its voltage is superimposed upon the voltage of the trolley wire, it being assumed that the frequency of the voltage of the trolley is 25 cycles. A key is also provided and so connected with respect to the signaling generator that, when it is operated, the signaling voltage is inductively connected to the trolley.

The receiving apparatus comprises a dynamometer type wattmeter element consisting of a stationary and a movable coil. A synchronous motor, which is also provided at the receiving station, is connected mechanically to an alternating-current generator that creates an alternating voltage having a frequency of 75 cycles. This generator is connected to the movable coil of the wattmeter element. The stationary coil of the wattmeter element is so connected that it is supplied with 25-cycle voltage from the trolley In the present case, I have shown my invention as applied to an electrical railway system, as it is of great utility therein. It often occurs that it is necessary to employ two locomotives to haul a large load. In this case, as a great number of cars are used, the locomotives are a considerable distance apart and some means must be provided for correlating the actions of the engineers in the locomotives. My invention provides effective means for accomplishing this result.

Referring now more particularly to Fig. 1, at 1 and 2 are shown diagrammatically two electric locomotives. The locomotive 1 is driven by a motor 3 that operates a drive wheel 4 resting upon a track 5. The driving motor is supplied with single-phase alternating current from a trolley wire 6 through a pantagraph trolley 7. The trolley wire is supplied from a feeder 8 through a transformer 9.

The motor 3 is inductively connected to the trolley 6 by a transformer 10. In a like manner, a synchronous single-phase motor 11 is inductively connected to the trolley wire by means of another winding of the transformer 10.

The motor 11 drives a generator 12 by means of a shaft 13. The generator 12 is adapted to generate an alternating voltage of 25 cycles and also a 75-cycle harmonic voltage. The motor 11 is so connected that the voltage produced by this generator is 180° out of phase with respect to the voltage in the trolley 6. This may be accomplished by rotating the stator of the signaling generator 12. Thus, this voltage will be neutralized and only the 75-cycle voltage will be superimposed on the trolley 6. This prevents the 25-cycle alternating current from the trolley from affecting the signaling generator.

At the receiving station in the second locomotive 2, a motor 20 is provided for operating the drive wheel 21 of the locomotive. A synchronous motor 22 is connected in multiple with the motor 20. The synchronous motor 22 is connected mechanically to a generator 23 by means of a shaft 24. The generator 23 generates an alternating voltage having a frequency of 75 cycles. The motors 22 and 20 are supplied from the trolley wire 6 through a pantagraph trolley 25 and a transformer 26. A third winding 27 of the transformer 26 is connected to a stationary coil 28 of a wattmeter element 29.

The wattmeter element 29 comprises a stationary coil 28 and a movable coil 30. The movable coil carries a shaft 31 to which is attached a contact-making member 32. At the opposite end of the shaft is fixed a damping disc 33 which may be made of copper, aluminum, or other suitable metal. A magnet 34 is so positioned that the magnetic field produced by it is cut by the aluminum disc 33. The contact-making member 32 is adapted to engage a contact member 35. The contact member 32 is connected to a selecting mechanism 36. The selecting mechanism 36 may be of any well-known type such, for example, as shown in the Harkness Patent No. 1,142,252, and is adapted to select one of a plurality of signaling devices, such as 37 and 38 in response to predetermined codes of current impulses.

In Fig. 2, the sine curve 50 shows the 25-cycle voltage that is present in the trolley wire. The curve 51 shows how this voltage is modified by the addition of the 75-cycle voltage generated by the signaling generator 12. In Fig. 3, the sine curve represents the 75-cycle voltage.

The operation of the apparatus at the receiving station produces no movement of the contact maker 32 when no signaling current is present in the trolley wire. The magnetic field set up by the stationary coil 28 of the wattmeter element reverses fifty times per second, as it is supplied with current from the trolley wire 6 through the transformer winding 27. The movable coil 30 is supplied with alternating current from the generator 23. The magnetic field produced by this current reverses one-hundred and fifty times per second, that is, three times as fast as the magnetic field produced by the stationary coil.

The result obtained is that, at one particular instant, the magnetic field produced by the stationary coil will be in the same direction as the magnetic field produced by the movable coil. At the next instant, when the magnetic field in the movable coil reverses, its field will be opposed to the field produced by the stationary coil. Consequently, there will be very little movement of the movable coil 30. This is especially true in view of the fact that the movement of the movable coil 30 has been damped by the eddy currents induced in the aluminum disc 33 by the magnet 34.

When the signaling key K at the transmitting station is operated, the trolley voltage is modified by the superposition of a 75-cycle voltage thereon, and, consequently, the trolley voltage has a wave form such as that shown by the curve 51, Fig. 2.

The 75-cycle harmonic is introduced into the stationary coil 28 of the wattmeter element 29 and, as a consequence thereof, the magnetic field produced by the stationary coil is greatly intensified at the time when the magnetic field produced by the 75-cycle current in the movable coil 30 is in the same direction, curve 52 of Fig. 2. Consequently, there will be a relatively large movement of the movable coil 30 in a series of increments corresponding to the crests of the voltage, as shown by curve 51, Fig. 2, and the contact-making member 32 will be caused to engage the member 35, thus operating the selecting device 36.

When the 75-cycle voltage reverses through the coil 28, with the signaling key K at the transmitting station 1 operated, the contact-making member 32 will remain in contact with the contact member 35. This is true because the magnetic field produced by the 75-cycle current in the stationary coil reverses at the same instant as the magnetic field produced by the 75-cycle current in the movable coil reverses. The two voltages are, therefore, operative to produce a turning torque between the coils 28 and 30.

By operating the key K, the selecting device 36 may be operated to select the one or the other of the selecting devices 37 and 38 to inform the engineer at the locomotive 2 what operation is to be performed. When the signaling key K is released, the voltage in the trolley 6 assumes its usual form and the movable coil returns to its normal position.

It will be obvious that the contact-making member 32 will not be influenced by a harmonic of another frequency in the trolley voltage by reason of the fact that this external voltage will not be of the same frequency as the voltage produced by the 75-cycle generator 23. Any other frequency may be chosen, of course, for the signaling current so long as the frequency of the generator 23 corresponds.

My invention is not limited to the particular arrangement of the apparatus described, but may be variously modified without departing from the spirit and scope thereof, as set forth in the appended claim.

I claim as my invention:

In an electrical system in which two separated vehicles derive their energy from a common trolley circuit supplied with alternating current of predetermined frequency, the combination with a signaling set on one vehicle consisting of a motor energized from the trolley and a generator driven thereby to develop an electromotive force of a frequency other than that of the system, means connecting the generator to the trolley to supply such different frequency thereto, means for controlling the generator, means on the other vehicle comprising an electro-responsive device having two windings, one of which is energized from the trolley and subjected to voltages of the system frequency and of the impressed frequency, means connected to the other winding to impress a voltage of frequency corresponding to that impressed upon the trolley by the signaling set, an auxiliary circuit and means operative in accordance with the frequencies impressed upon said windings for controlling said auxiliary circuit to effect a desired result.

In testimony whereof, I have hereunto subscribed my name this 6th day of May, 1924.

ROBERT D. EVANS.